(12) United States Patent
Buckley et al.

(10) Patent No.: US 10,101,897 B1
(45) Date of Patent: Oct. 16, 2018

(54) ELECTRONIC STYLUS FOR STORING CREDENTIALS

(71) Applicant: GOOGLE INC., Mountain View, CA (US)

(72) Inventors: Thomas Buckley, San Francisco, CA (US); Alexander Friedrich Kuscher, San Francisco, CA (US); Katie Leah Roberts-Hoffman, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 71 days.

(21) Appl. No.: 15/265,357

(22) Filed: Sep. 14, 2016

(51) Int. Cl.
| | |
|---|---|
| *G06F 3/0487* | (2013.01) |
| *G06F 3/0354* | (2013.01) |
| *G06F 3/038* | (2013.01) |
| *G06F 3/01* | (2006.01) |
| *G06F 3/0482* | (2013.01) |
| *G06F 21/31* | (2013.01) |
| *G06F 21/35* | (2013.01) |

(52) U.S. Cl.
CPC ............ *G06F 3/0487* (2013.01); *G06F 3/017* (2013.01); *G06F 3/0383* (2013.01); *G06F 3/03545* (2013.01); *G06F 3/0482* (2013.01); *G06F 21/31* (2013.01); *G06F 21/35* (2013.01)

(58) Field of Classification Search
None
See application file for complete search history.

(56) References Cited

U.S. PATENT DOCUMENTS

| | | | |
|---|---|---|---|
| 5,633,471 A | 5/1997 | Fukushima | |
| 6,307,956 B1 | 10/2001 | Black | |
| 6,529,189 B1 | 3/2003 | Colgan et al. | |
| 7,609,863 B2 | 10/2009 | Black | |
| 9,122,334 B1* | 9/2015 | Olsen | G06F 3/03545 |
| 9,158,393 B2 | 10/2015 | Vlasov | |
| 9,261,985 B2 | 2/2016 | Hicks | |
| 9,495,011 B1* | 11/2016 | Lee | G06F 3/016 |
| 2003/0076340 A1 | 4/2003 | Hatori et al. | |
| 2011/0162894 A1* | 7/2011 | Weber | G06F 3/03545 178/19.03 |
| 2013/0249823 A1 | 9/2013 | Ahn et al. | |
| 2014/0035883 A1 | 2/2014 | Mercea et al. | |

(Continued)

FOREIGN PATENT DOCUMENTS

CN 202649946 U 1/2013

OTHER PUBLICATIONS

"Monteverde 10 Color Ballpoint Pen—20 piece tub (MV73610)", retrieved on Apr. 19, 2016 from www.staples.com, 6 pages.

(Continued)

*Primary Examiner* — Nicholas Lee
(74) *Attorney, Agent, or Firm* — Brake Hughes Bellermann LLP

(57) ABSTRACT

An electronic stylus may include a wireless interface, a memory, and a processor. The wireless interface may be configured to send and receive signals to and from at least a first computing system and a second computing system. The memory may be configured to store text. The processor may be configured to store, in the memory, a text string received from the first computing system via the wireless interface, and send, to the second computing system via the wireless interface, the text string received from the first computing system.

28 Claims, 11 Drawing Sheets

(56) References Cited

U.S. PATENT DOCUMENTS

2014/0146201 A1    5/2014   Knight et al.
2014/0253470 A1*   9/2014   Havilio ................. G06F 3/0412
                                                                                 345/173

OTHER PUBLICATIONS

"Use a pen to draw, write, or highlight text on a Windows tablet", Microsoft, 2016, 8 pages.
Stanke, "How to use the S Pen's Air View Mode on the Samsung Galaxy Note 4", Blog, Feb. 13, 2015, 8 pages.

* cited by examiner

US 10,101,897 B1

ELECTRONIC STYLUS FOR STORING CREDENTIALS

TECHNICAL FIELD

This description relates to electronic styluses.

BACKGROUND

Computing systems may be used to write text documents and maintain user accounts.

SUMMARY

According to an example, an electronic stylus may include a wireless interface, a memory, and a processor. The wireless interface may be configured to send and receive signals to and from at least a first computing system and a second computing system. The memory may be configured to store text. The processor may be configured to store, in the memory, a text string received from the first computing system via the wireless interface, and send, to the second computing system via the wireless interface, the text string received from the first computing system.

According to an example, a non-transitory computer-readable storage medium may comprise instructions stored thereon. When executed by at least one processor, the instructions may be configured to cause a first computing system to at least wirelessly send, to an electronic stylus, a first text string, the first text string being selected by the electronic stylus, wirelessly receive, from the electronic stylus, a second text string, the second text string having been received by the electronic stylus from a second computing system, and add the second text string to a document.

According to an example, a non-transitory computer-readable storage medium may comprise instructions stored thereon. When executed by at least one processor, the instructions may be configured to cause an electronic stylus to at least store a text string received from a first computing system via a wireless interface, and send, to a second computing system via the wireless interface, the text string received from the first computing system.

According to an example, an electronic stylus may comprise a wireless interface and a trusted platform module (TMP). The wireless interface may be configured to send and receive signals to and from at least a first computing system and a second computing system. The TPM may be configured to encrypt credentials received from a first computing system via the wireless interface, store the encrypted credentials, and transmit the stored credentials to a second computing system via the wireless interface.

According to an example, an electronic stylus may include means for sending and receiving signals to and from at least a first computing system and a second computing system, means for storing text, and means for storing, in the means for storing text, a text string received from the first computing system via the means for sending and receiving signals, and send, to the second computing system via the means for sending and receiving signals, the text string received from the first computing system.

According to an example, an electronic stylus may comprise means for sending and receiving signals to and from at least a first computing system and a second computing system, and means for encrypting credentials received from a first computing system via the means for sending and receiving signals, storing the encrypted credentials, and transmitting the stored credentials to a second computing system via the means for sending and receiving signals.

The details of one or more implementations are set forth in the accompanying drawings and the description below. Other features will be apparent from the description and drawings, and from the claims.

DETAILED DESCRIPTION

An electronic stylus may be used to interact with a first computing system, such as by highlighting text on a display of the first computing system. In response to a copy command, the first computing system may transmit copied text, which may be the highlighted text, to the electronic stylus. The electronic stylus may store the copied text. A user may bring the electronic stylus to a second computing system. In response to a paste command, the electronic stylus may transmit the copied text to the second computing system. The second computing system may display the copied text.

Figure 1A:
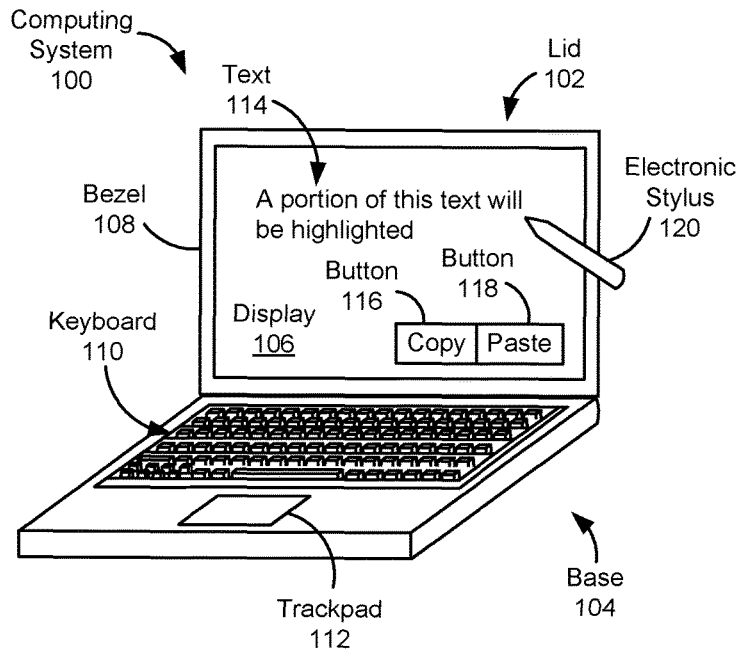
FIG. 1A shows a first computing system and electronic stylus according to an example implementation.

FIG. 1A shows a first computing system 100 and electronic stylus 120 according to an example implementation.

While the example first computing system 100 shown in FIG. 1A is a laptop or notebook computer, the techniques described herein may be applied to any computing system that receives input from an electronic stylus, such as a desktop computer, a tablet computer, a phablet computer, a thin client, a smartphone, or a personal digital assistant (PDA), as non-limiting examples.

In the example shown in FIG. 1A, the first computing system 100 includes a lid 102 rotatably attached to a base 104. The first computing system 100 may include a transceiver (shown in FIG. 2B) for transmitting and receiving (such as wirelessly transmitting and receiving) signals, such as transmitting signals to and receiving signals from an electronic stylus 120 via a wired or wireless interface. The base 104 may include human interface devices (HIDs) for receiving input, such as a keyboard 110 and a trackpad 112.

The lid 102 may include a display 106 surrounded by a bezel 108. The display 106 may provide graphical output, such as text 114 and/or buttons 116, 118. The display 106 may also receive and/or process input from the electronic stylus 120, such as a location and/or proximity of an end point of the electronic stylus 120 on or near the display 106. The display 106 may determine the location of the end point of the electronic stylus 120 based on the electronic stylus 120 changing capacitance of wires in a capacitive grid of the display 106 or modifying and emitting back to the display 106 electromagnetic waves emitted by the display 106 (such as electromagnetic resonance), as non-limiting examples.

As discussed above, the display 106 may display text 114. The user may have typed the text 114, in this example, "A portion of this text will be highlighted," into the keyboard 110, prompting the first computing system 100 to display the text 114 on the display 106. The display 106 may also display a copy button 116 and a paste button 118. The computing system 100 may, in response to a user clicking on the copy button 116 with a mouse or trackpad 112, store highlighted text into a buffer of the computing system 100. The computing system 100 may, in response to the user clicking on the paste button 118 with the mouse or trackpad 112, insert text copied or stored in the buffer into a location on the display 106 where a cursor is located.

The computing system 100 may respond differently when the electronic stylus 120 taps on the copy button 116 or paste button 118 than when the mouse or trackpad 112 clicks on the copy button 116 or paste button 118. In response to the electronic stylus 120 tapping the copy button 116, the computing system 100 may transmit (such as wirelessly) highlighted text to the electronic stylus 120, and the electronic stylus 120 may store the text in a memory of the electronic stylus 120. In response to the electronic stylus 120 tapping the paste button 118, the computing system 100 may send to the electronic stylus 120 a request for copied text, the electronic stylus 120 may transmit (such as wirelessly) the copied text to the first computing system 100, and the first computing system 100 may display the copied text at a location on the display 106 based on where a cursor is located on the display 106. While FIG. 1A shows the copy and paste buttons 116, 118 in a lower-right portion of the display 106, the buttons 116, 118 may be located in any portion of the display 106, or may appear in response to a predetermined gesture such as a tap or a swipe on the display 106 by the electronic stylus 120. In another example implementation, the display 106 may not display any copy or paste buttons 116, 118, and the copy and paste functions described within this paragraph may be performed in response to predetermined gestures, such as taps or swipes on the display 106, performed by the electronic stylus 120.

Figure 1B:
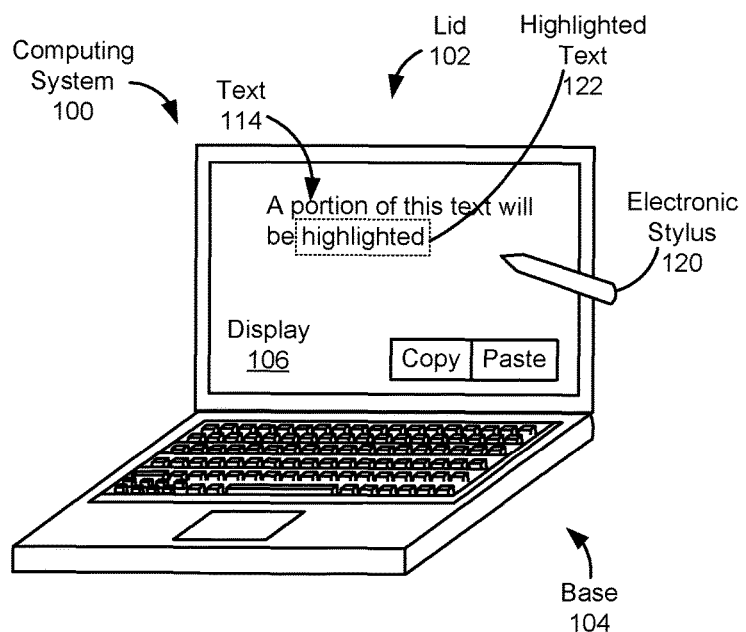
FIG. 1B shows the electronic stylus highlighting a portion of text in a display of the first computing system according to an example implementation.

FIG. 1B shows the electronic stylus 120 highlighting a portion of text 114 in the display 106 of the first computing system 100 according to an example implementation. The electronic stylus 120 may slide over or encircle a portion of the text 114, causing the computing system 100 and/or display 106 to highlight the portion of text 114 over which the electronic stylus 120 slid or encircled. In an example implementation, the electronic stylus 120 may slide over or encircle the text 114, causing the computing system 100 to present a prompt allowing the user to accept highlighting or copying the text (such as by the electronic stylus 120 tapping a bubble or other graphic on the display 106). In the example shown in FIG. 1B, the portion of the text 114 that becomes highlighted, the highlighted text 122, is the word, "highlighted." Highlighting may include changing the visual appearance of the highlighted text 122, such as changing a background color of the highlighted text 122, changing a color of the highlighted text 122, or changing a font or typeface of the highlighted text 122, as non-limiting examples. The computing system 100 and/or display 106 may have highlighted the highlighted text 122 in response to interaction between the electronic stylus 120 and the display 106, such as the electronic stylus 120 sliding over or encircling the highlighted text 122, or based on instructions from the user entered into the first computing system 100 via the HIDs.

Figure 1C:
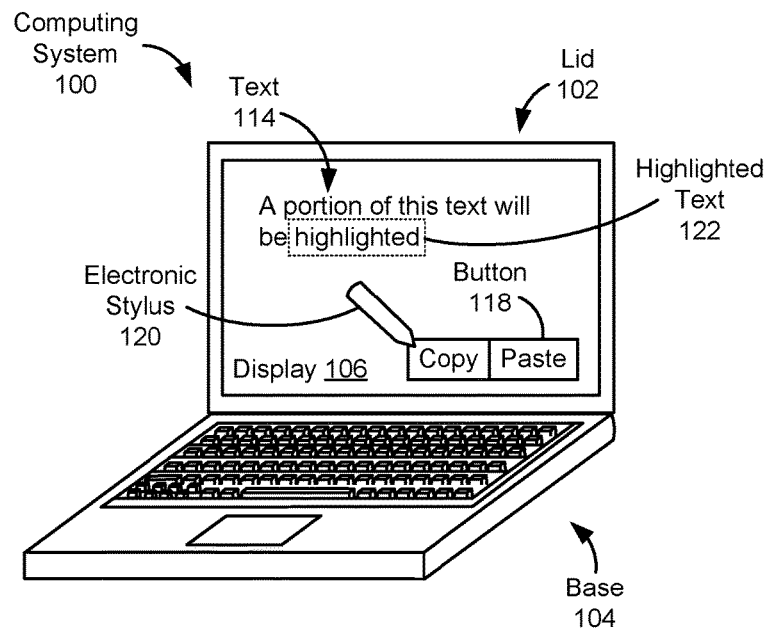
FIG. 1C shows the electronic stylus copying the highlighted text according to an example implementation.

FIG. 1C shows the electronic stylus 120 copying the highlighted text 122 according to an example implementation. In this example, the electronic stylus 120 begins the process of copying the highlighted text 122 by tapping the copy button 116 on the display 106. In other examples, the copying process may begin in response to an instruction entered into the computing system 100 via the HIDs, or based on the electronic stylus 120 recognizing a gesture based on movement of the electronic stylus 120 or the user clicking one or more buttons on the electronic stylus 120.

As discussed above, copying the highlighted text 122 to the electronic stylus 120 may be a different operation and/or process, and may be performed in response to a different instruction, than copying the highlighted text 122 to a buffer of the computing system 100. For example, copying the highlighted text 122 may be performed in response to the electronic stylus 120 tapping the copy button 116, rather than the user clicking on the copy button 166 via a mouse or trackpad. In another example, the computing system 100 may respond to the user clicking on the copy button 116 via the mouse or trackpad while the electronic stylus 120 is proximal to and/or in communication with the computing system 100 by providing the user the option of copying the highlighted text 122 to either the electronic stylus 120 or the buffer of the computing system 100, and if the user selects the electronic stylus 120, beginning the process and/or operation of copying the highlighted text 122 to the electronic stylus 120. In other examples, the copy operation may be performed in response to the first computing system 100 recognizing a gesture performed by the electronic stylus 120 on the display 106, in response to the electronic stylus 120 recognizing a gesture including movement of the electronic stylus 120, or by a user pressing a button on the electronic stylus 120, as non-limiting examples.

The first computing system 100 may copy the highlighted text 122 to the electronic stylus by transmitting (such as wirelessly) the highlighted text 122 to the electronic stylus 120. The first computing system 100 may send a copy instruction to the electronic stylus 120, with the copy instruction including the highlighted text 122. The electronic stylus 120 may respond to receiving the highlighted text 122 by storing the highlighted text 122 in a memory of the electronic stylus 120. The electronic stylus 120 may thereafter paste the stored highlighted text 122 back into the first computing system 100, or may paste the stored highlighted text into another computing system, such as a second computing system.

In an example implementation, the electronic stylus 120 may store a state associated with the first computing system 100. The state may include a particular webpage displayed by the first computing system 100, contents of a cache of a web browser running on the first computing system 100, or contents of an application, such as a word processing application, running on the first computing system 100. The first computing system 100 may send the state to the electronic stylus 120, prompting the electronic stylus 120 to save the state, periodically or in response to events, such as saving a document, ending a login session, or in response to closing or exiting the application, as non-limiting examples.

After the electronic stylus 120 has copied and/or stored the highlighted text 122 and/or state, the user may move the electronic stylus 120 away from the first computing system 100 and proximal to a second computing system. The user may use the electronic stylus 120 to interact with the second computing system.

Figure 1D:
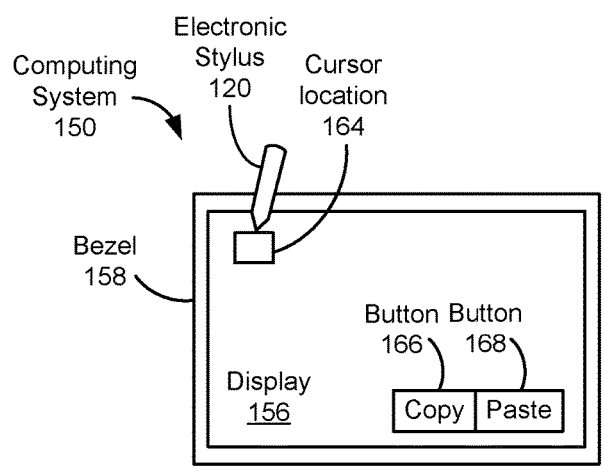
FIG. 1D shows the electronic stylus selecting a cursor location on a display of a second computing system according to an example implementation.

FIG. 1D shows the electronic stylus 120 selecting a cursor location 164 on a display 156 of a second computing system 150 according to an example implementation. The electronic stylus 120 may select the cursor location 164 by, for example, tapping on the display 156, prompting the second computing system 150 to generate and/or present a cursor at the cursor location 164 where the electronic stylus 120 tapped.

In the example shown in FIG. 1D, the second computing system 150 includes a tablet computer. However, the techniques described herein may be applied to any computing system that receives input from an electronic stylus, such as a desktop computer, a laptop or notebook computer, a phablet computer, a thin client, a smartphone, or a personal digital assistant (PDA), as non-limiting examples. The second computing system 150 may perform any combination of functions, methods, or techniques described herein with respect to the first computing system 100 and the electronic stylus 120, and the first computing system 100 may perform any combination of functions, methods, or techniques described herein with respect to the second computing system 150 and the electronic stylus 120.

In the example shown in FIG. 1D, the computing system 150 may include a display 156, which may include any feature of the display 106 described above, surrounded by a bezel 158. The display 156 may present a copy button 166 and a paste button 168, both of which may include any feature and/or prompt similar responses as the copy button 116 and paste button 118 described above.

Figure 1E:
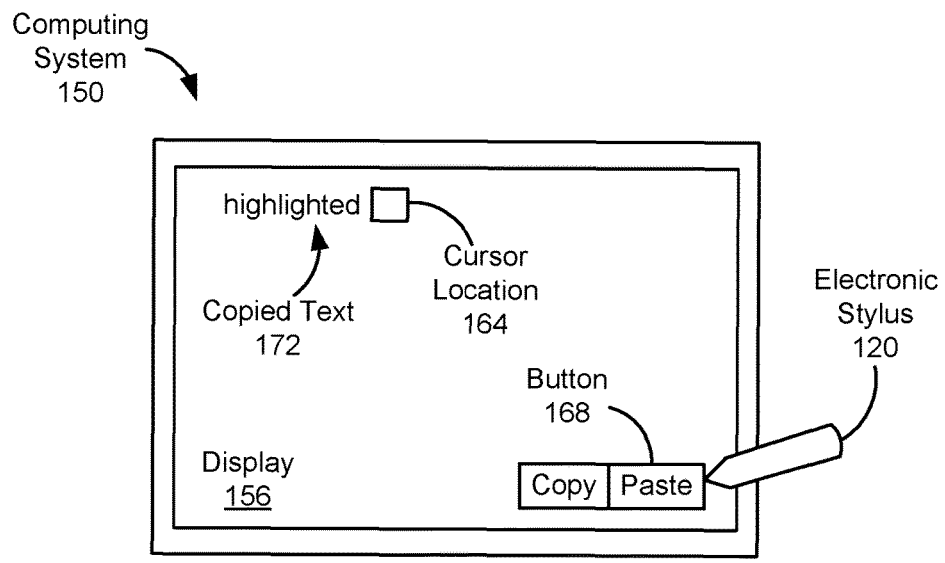
FIG. 1E shows the electronic stylus pasting the portion of text into the second computing system according to an example implementation.

FIG. 1E shows the electronic stylus 120 pasting the portion of text into the second computing system 150 according to an example implementation. In this example, the electronic stylus 120 may initiate the paste operation by tapping the paste button 168. The paste operation may also be initiated by a gesture of the electronic stylus 120 onto the display 156 detected by the display 156, by a gesture including movement detected and/or recognized by the electronic stylus 120, or by a user pressing one or more buttons on the electronic stylus 120, as non-limiting examples.

The paste operation may include the second computing system 150 sending a paste instruction to the electronic stylus 120, or the electronic stylus 120 initiating the paste operation in response to recognizing a gesture or button push. The paste operation may include the electronic stylus 120 transmitting (such as wirelessly) the stored highlighted text 122 to the second computing system 150, and the second computing system 150 displaying the highlighted text 122 as copied text 172 at the cursor location 164. In response to the copied text 172 appearing at the cursor location 164, the cursor location 164 may move to the end of the copied text 172.

Figure 1F:
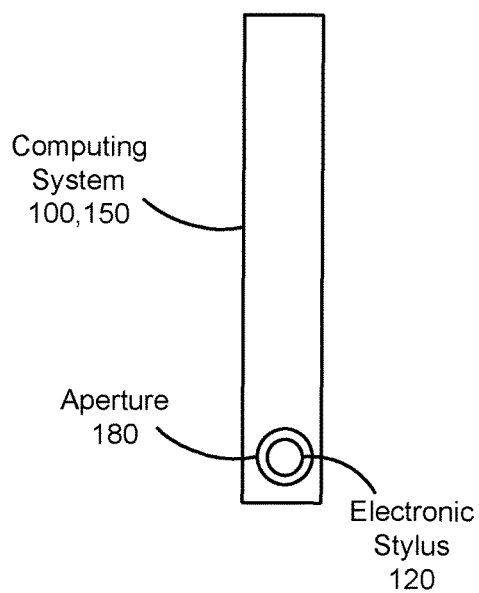
FIG. 1F shows the electronic stylus recharging inside either of the computing systems according to an example implementation.

FIG. 1F shows the electronic stylus 120 recharging inside either of the computing systems 100, 150 according to an example implementation. The computing system 100, 150 may include an aperture 180 for receiving the electronic stylus 120. A user may store the electronic stylus 120 inside the aperture 180. While the electronic stylus 120 is stored inside the aperture 180, the computing system 100, 150 may recharge a rechargeable battery inside the electronic stylus 120. The computing system 100, 150 may include, for example, a mechanical detector such as a latch or switch that detects the presence of the electronic stylus 120 inside the aperture 180, prompting the computing system 100, 150 to recharge the electronic stylus 120. The computing system 100, 150 may recharge the electronic stylus 120 by inducing a magnetic field, which the electronic stylus 120 converts into an electric current via one or more coils included in the electronic stylus 120, or by directly flowing electricity into the electronic stylus 120 via electrical contacts included in the computing system 100, 150 and the electronic stylus 120, as non-limiting examples.

Figure 1G:
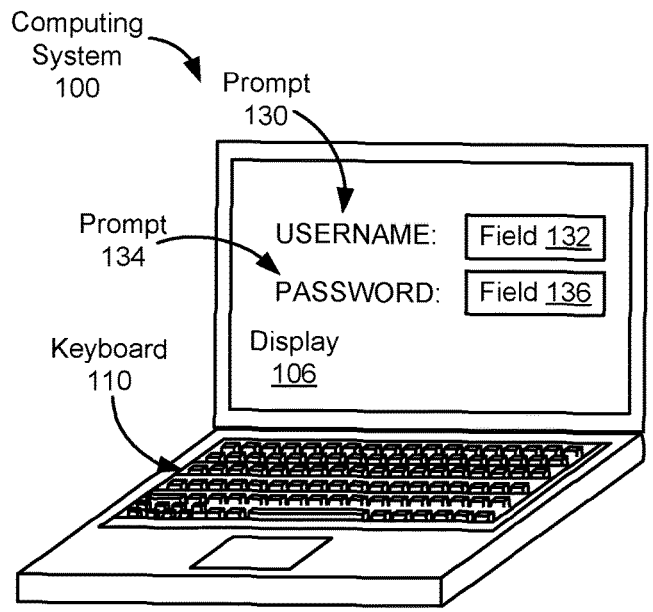
FIG. 1G shows the first computing system prompting a user to log into a user account according to an example implementation.

FIG. 1G shows the first computing system 100 prompting a user to log into a user account according to an example implementation. In this example, the computing system 100 may present a prompt 130 for the user to enter a username associated with an account into a field 132, and a prompt 134 for the user to enter a password associated with the account into a field 136. The first computing system 100 may log the user into the account, initiating a login session, based on and/or in response to the user entering a username and password associated with the account.

Figure 1H:
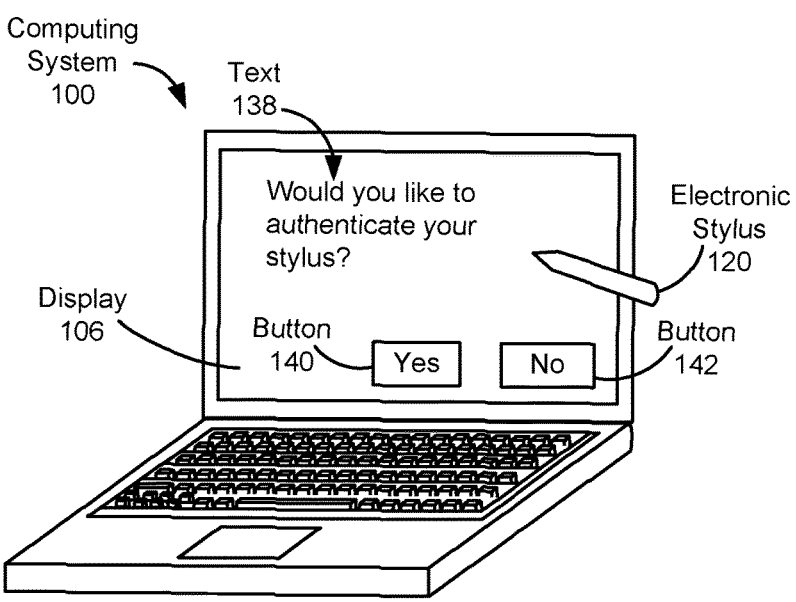
FIG. 1H shows the first computing system prompting the user to transmit authentication credentials to the stylus according to an example implementation.

FIG. 1H shows the first computing system 100 prompting the user to transmit authentication credentials to the stylus 120 according to an example implementation. The computing system 100 may present the text 138 and buttons 140 after the user has logged in, such as after entering the username and password as shown and described with respect to FIG. 1G. The computing system 100 may present text 138, such as, "Would you like to authenticate your stylus?," inquiring whether the user would like the computing system 100 to transmit authentication credentials, such as the username and/or password, to the stylus 120. If the user indicates that he or she does want the computing system 100 to transmit the authentication credentials, and/or instructs the computing system 100 to transmit the authentication credentials, the computing system 100 may transmit the authentication credentials to the stylus 120. The stylus 120 may store the authentication credentials, enabling the user to log into the computing system 100 at a later time and/or log into a different computing system, such as the second computing system 150.

Figure 1I:
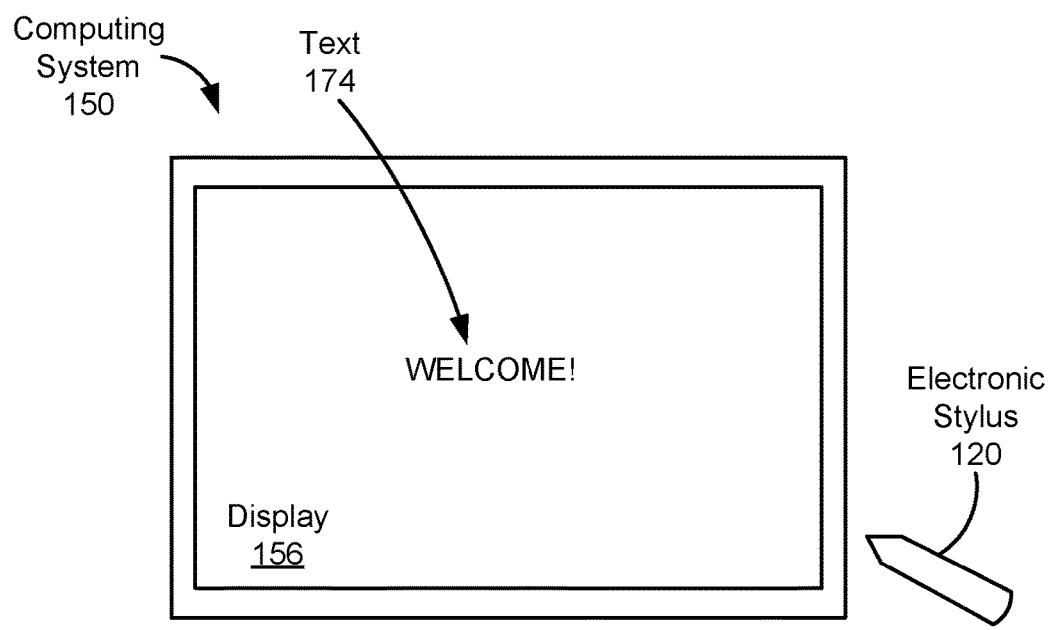
FIG. 1I shows the second computing system logging the user in based on proximity of the stylus according to an example implementation.

FIG. 1I shows the second computing system 150 logging the user in based on proximity of the stylus 120 according to an example implementation. In this example, the stylus 120 may have previously stored authentication credentials associated with a user account, as discussed above with respect to FIGS. 1G and 1H. The electronic stylus 120 may transmit the credentials to the computing system 150, relieving the user of the burdens of remembering and/or typing the credentials into the computing system 150, and the computing system 150 may respond to receiving the credentials by logging the user in and beginning a login session. The stylus 120 may transmit the credentials to the computing system 150 based only on proximity of the stylus 120 to the computing system 150, based on proximity and a request from the computing system 150, and/or based on satisfaction of an authentication requirement by the user, such as a biometric authentication including a fingerprint or thumbprint on the stylus 120. The computing system 150 may log the user in based only on the presence of the stylus 120, or may require a second authentication factor, such as entry of a predetermined gesture, signature, or phrase into the computing system 150. At the initiation of the login session, the computing system 150 may present text 174, such as, "WELCOME!"

Figure 2A:
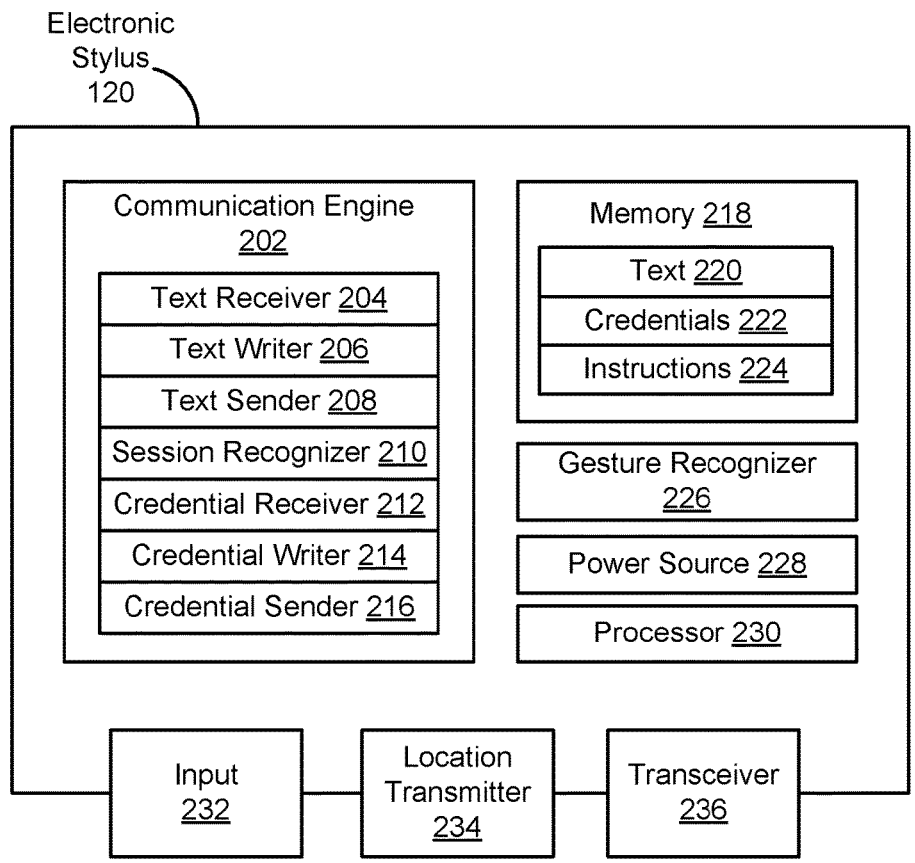
FIG. 2A is a block diagram of the electronic stylus according to an example implementation.

FIG. 2A is a block diagram of the electronic stylus 120 according to an example implementation. The electronic stylus 120 may include a communication engine 202. The communication engine 202 may process information, such as text, state information, and/or credentials, received from a computing system 100, 150, and generate information for sending to the computing system 100, 150 (which may be the same or different computing system from which the text, state information, and/or credentials were received).

The communication engine 202 may include a text receiver 204. The text receiver 204 may process text, such as the text 114 shown and described above with respect to FIGS. 1A, 1B, and 1C, received from the computing system 100. The text receiver 204 may receive and/or process the text sent by the computing system 100 in response to a copy instruction, which may be prompted by the electronic stylus 120 tapping a copy button 116 on the display 106 of the computing system 100.

The communication engine 202 may include a text writer 206. The text writer 206 may write and/or store the text received and/or processed by the text receiver 204 in memory 218.

The communication engine 202 may include a text sender 208. The text sender 208 may retrieve from memory 218, and/or generate, a text string for sending to a computing system 150. The text string may have been stored in memory 218 in response to a copy operation and/or copy instruction. The text sender 208 may retrieve and/or generate the text string in response to the electronic stylus 120 receiving a paste instruction from the computing system 150, or based on the electronic stylus 120 recognizing a paste instruction from the user, such as based on a button or combination of buttons on the electronic stylus 120 pressed by the user or based on recognizing a paste gesture based on movement of the electronic stylus 120.

The communication engine 202 may include a session recognizer 210. The session recognizer 210 may recognize a login session associated with a user and a computing system 100, 150. The session recognizer 210 may recognize and/or determine whether a user associated with credentials stored in memory 218 is logged into a computing system 100, 150.

The communication engine 202 may include a credential receiver 212. The credential receiver 212 may process credentials, which may be login credentials associated with a user, such as a username, passcode, and/or cryptographic keys, received from a computing system 100, 150. The credential receiver 212 may process and/or receive the credentials during a login session with the computing system 100, 150 after the user has logged into the computing system 100, 150. Receiving the credentials during the login session may allow the user to later log into the computing system 100, 150 or other computing systems 100, 150 with the electronic stylus, saving the user time by not having to enter login credentials such as username and/or passcode.

The communication engine 202 may include a credential writer 214. The credential writer 214 may write and/or store in memory 218 the credentials received and/or processed by the credential receiver 212. The credential writer 214 may, for example, write over previously stored credentials. In an example implementation, the electronic stylus 120 may store credentials associated with only one user account, and if the credential writer 214 stores credentials for a user account such as a second user account, any credentials previously stored for a first user account are erased, deleted, and/or written over.

The electronic stylus 120 may include memory 218. The memory 218 may include a non-transitory computer-readable storage medium. The memory 218 may store text 220. The text 220 may, for example, be stored in a portion of the memory 218 that is included in a processor 230, such as cache or a scratchpad. The text 220 may include text such as text 114, received and/or processed by the text receiver 204 and written and/or stored by the text writer 206 in response to a copy instruction and/or received from a computing system 100. The text 220 may be accessed by the text sender 208 for sending and/or copying to a computing system 150.

The memory 218 may store credentials 222. The credentials 222 may include login credentials, such as a username, passcode, and/or cryptographic keys, used to login to a computing system and/or account in association with a user account. The credentials 222 may be received and/or processed by the credential receiver 212 during a login session when a computing system 100 sends the credentials to the electronic stylus 120, and may be written and/or stored by the credential writer 214. The credentials 222 may be accessed by the credential sender 216 for sending to a computing system 150 for logging into the computing system 150 in association with the user account.

The memory 218 may store state information. The state information may include, for example, a website and/or webpage currently displayed by a browser of a first computing system 100 in communication with the electronic stylus 120, cache content stored by the browser, or applications running on and/or session data stored by the first computing system 100. The electronic stylus 120 may provide the stored state information to a second computing system 150, enabling the second computing system 150 to open the webpage, application(s) and/or load data so that the user seamlessly transitions from operating the first computing system 100 to operating the second computing system 150 as if continuing to operate the same computing system.

The memory 218 may store instructions 224. The instructions 224 may be computer-readable instructions. The instructions 224, when executed by at least one processor, may cause the electronic stylus 120 to perform any combination of the methods, techniques, and/or functions described herein with reference to the electronic stylus 120.

The electronic stylus 120 may include a gesture recognizer 226. The gesture recognizer 226 may recognize gestures, such as copy gestures, paste gestures, highlight gestures, and/or tap gestures, based on movement of the electronic stylus 120. The gesture recognizer 226 may include a library of gestures, which may include combinations of directions of movement, speeds of movement, and/or acceleration of the electronic stylus 120. The gesture recognizer 226 may compare movements of the electronic stylus to gestures in the library, and if the movements match a gesture in the library, recognize the gesture. The electronic stylus 120 may initiate an operation, such a copy operation or a paste operation, based on the recognized gesture.

The electronic stylus 120 may include a power source 228. The power source 228 may provide power, such as electricity, to other components, modules, and/or devices in the electronic stylus 120. The power source 228 may include a battery, such as a rechargeable battery. The power source 228 may be recharged from an electrical wall outlet, or from a computing system 100, 150, such as when the electronic stylus 120 is stored in the computing system 100, 150, as shown in the example of FIG. 1F.

The electronic stylus 120 may include at least one processor 230. The at least one processor 230 may execute instructions, such as the instructions 224 stored in memory 218, to cause the electronic stylus 120 to perform any combination of the methods, techniques, and/or functions described herein with reference to the electronic stylus 120.

The electronic stylus 120 may include one or more input nodes 232. The input nodes 232 may include one or more buttons to receive input from a user, a fingerprint sensor to detect and recognize a user's fingerprint(s), and/or a motion detector or accelerometer to detect motion based upon which the gesture recognizer 226 may recognize gestures.

The electronic stylus 120 may include a location transmitter 234. The location transmitter 234 may transmit a location of an end portion of the electronic stylus 120 to the computing system 100, 150, enabling the computing system 100, 150 to determine the location of the end portion of the electronic stylus 120 with respect to the display 106, 156 of the computing system 100, 150. The location transmitter 234 may, for example, transmit wireless and/or electromagnetic signals, such as in an infrared spectrum, which the computing system 100, 150 may receive and process to determine the location of the location transmitter 234 and/or the end portion of the electronic stylus 120. The computing system 100, 150 may receive and process the signals when the location transmitter 234 is contacting, or near, the display 106, 156. The computing system 100, 150 may perform actions based on the location of the location transmitter 234 and/or end portion of the stylus 120 with respect to the display 106, 156, such as positioning a cursor, highlighting text, and/or initiating copy or paste operations.

The electronic stylus 120 may include a transceiver 236. The transceiver 236 may send and receive signals, which may be wired signals or wireless signals, to and from the computing system 100, 150. The signals may include instructions, such as copy or paste, or data, such as copied or pasted text, credentials, or state information.

Figure 2B:
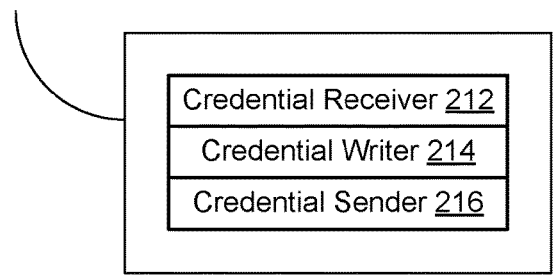
FIG. 2B is a block diagram of a trusted platform module (TPM) according to an example implementation.

FIG. 2B is a block diagram of a trusted platform module (TPM) 211 according to an example implementation. The TPM 211 may be included in the electronic stylus 120, and may perform any combination of methods, functions, and/or techniques described above with respect to the credential receiver 212, credential writer 214, and/or credential sender 216. The TPM 211 may include a microprocessor that securely stores credentials associated with a user account. The TPM 211 may securely store the credentials by encrypting the credentials upon receipt, so that the credentials are stored in an encrypted form and not accessible to unauthorized persons or entities, or may store the credentials as cryptographic keys which will be transmitted to a computing system 100, 150 to log a user into the computing system 100, 150 in association with the user account. The TPM 211 may, for example, encrypt a username and/or password associated with a user account. The TPM 211 may decrypt the username and password and either send the decrypted username and/or password to the computing system 100, 150, or re-encrypt the username and/or password according to an encryption scheme that the computing system 100, 150 can decrypt, and send the re-encrypted username and/or password to the computing system 100, 150, according to example implementations. The TPM 211 may store the credentials in the credentials 222 portion of memory 218, or in a local memory accessible only to the TPM 211, according to example implementations.

Figure 2C:
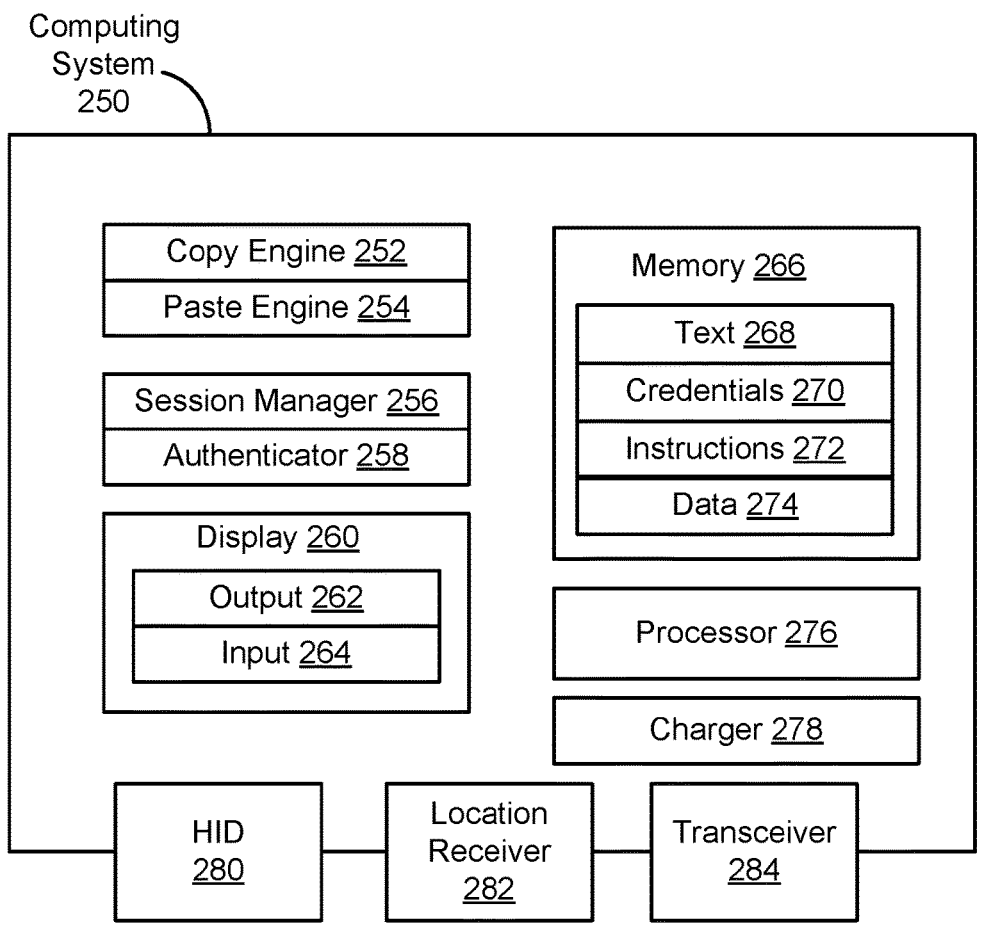
FIG. 2C is a block diagram of either of the computing systems according to an example implementation.

FIG. 2C is a block diagram of either of the computing systems 100, 150 according to an example implementation. The computing system 250 may include any combination of features of the computing systems 100, 150 described herein.

The computing system 250 may include a copy engine 252. The copy engine 252 may perform copy operations, such as sending copied and/or highlighted text to the electronic stylus 120. The copy engine 252 may perform the copy operation in response to the electronic stylus 120 tapping the copy button 116, or in response to a copy instruction that the electronic stylus 120 sent to the computing system 250 based on the gesture recognizer 226 recognizing a copy gesture or one or more buttons on the electronic stylus 120 being pushed, as non-limiting examples.

The computing system 250 may include a paste engine 254. The paste engine 254 may perform paste operations, such as receiving copied and/or pasted text from the electronic stylus 120 and presenting the text on the display 260, 106, 156. The paste engine 254 may perform the paste operation in response to the electronic stylus 120 tapping the paste button 118, or in response to a paste instruction that the electronic stylus 120 sent to the computing system 250 based on the gesture recognizer 226 recognizing a paste gesture, as non-limiting examples.

The computing system 250 may include a session manager 256. The session manager 256 may manage and/or maintain sessions. The sessions may be associated with a user account. The session manager 256 may determine when a session begins and/or ends, and may determine data, files, and/or applications that may be accessed based on the user account associated with the session.

The computing system 250 may include an authenticator 258. The authenticator 258 may authenticate a user account in association with a session. The authenticator 258 may authenticate the user account based on entry of a user name and passcode and/or biometric data, or based on credentials such as cryptographic keys received from the electronic stylus 120. The authenticator 258 may, for example, compare received credentials to credentials 270 stored in memory 266.

The computing system 250 may include a display 260. The display 260 may include any features described above with respect to the displays 106, 156. The display 260 may include an output module 262, which may present graphical output such as text, icons, images, and/or pictures, and an input module 264, which may receive touch input and/or location input from the electronic stylus 120 to determine the location of the end portion of the electronic stylus 120.

The computing system 250 may include memory 266. The memory 266 may include a non-transitory computer-readable storage medium. The memory 266 may store text 268, such as text 114, 172 presented on the display 106, 156, 260, text 122 transmitted to the electronic stylus 120, and/or text 172 received from the electronic stylus 120.

The memory 266 may store credentials 270. The computing system 250 may compare the stored credentials 270 to credentials provided by a user and/or the electronic stylus 120 to log in and/or initiate a session associated with a user account. The credentials 270 may include a username and passcode, biometric information, and/or cryptographic keys, as non-limiting examples. The computing system 250 may provide and/or transmit the credentials 270 to the electronic stylus 120 during a login session, enabling the electronic stylus 120 to later provide and/or transmit the credentials to the computing system 250 or another computing system to log the user into the computing system.

The memory 266 may store instructions 272. The instructions 272 may be executable by one or more processors. When executed by at least one processor, the instructions 272 may cause the computing system 250 to perform any combination of the methods, techniques, and/or functions described herein with reference to any of the computing systems 100, 150, 250. The memory 266 may store data 274. The data 274 may include any information generated based on, or used to perform, any of the methods, techniques, and/or functions described herein with reference to any of the computing systems 100, 150, 250, and any state information generated and/or relied upon in performing any of the methods, techniques, and/or functions of the computing systems 100, 150, 250.

The computing system 250 may include at least one processor 276. The at least one processor 276 may be capable of executing instructions, such as instructions 272 stored in memory 266, to perform any combination of the methods, techniques, and/or functions described herein with reference to any of the computing systems 100, 150, 250.

The computing system 250 may include a charger 278. The charger 278 may charge and/or recharge the power source 228, such as a rechargeable battery, of the electronic stylus 120, when the electronic stylus 120 is stored in the aperture 180 of the computing system 100, 150, 250, as shown in the example of FIG. 1F. The charger 278 may charge and/or recharge the power source 228 by inductive charging or via electrical contacts, as non-limiting examples.

The computing system 280 may include one or more human interface devices (HIDs) 280. The HIDs 280 may receive input from a user. The HIDs 280 may include a keyboard 110 and trackpad 112, for example.

The computing system 250 may include a location receiver 282. The location receiver 282 may receive input from the electronic stylus 120 to determine a location of the electronic stylus 120 and/or an end portion of the electronic stylus 120. The location receiver 282 may determine the location of the end point of the electronic stylus 120 based, for example, on the electronic stylus 120 changing capacitance of wires in a capacitive grid of the display 260 or modifying and emitting back to the display 260 electromagnetic waves emitted by the display 260 (such as electromagnetic resonance).

The computing system 250 may include one or more transceivers 284. The transceiver(s) 284 may include a wired or wireless interface for communicating with the electronic stylus 120. The transceiver 284 may, for example, send and receive text, credentials, and/or state information to and from the electronic stylus 120.

Figure 3:
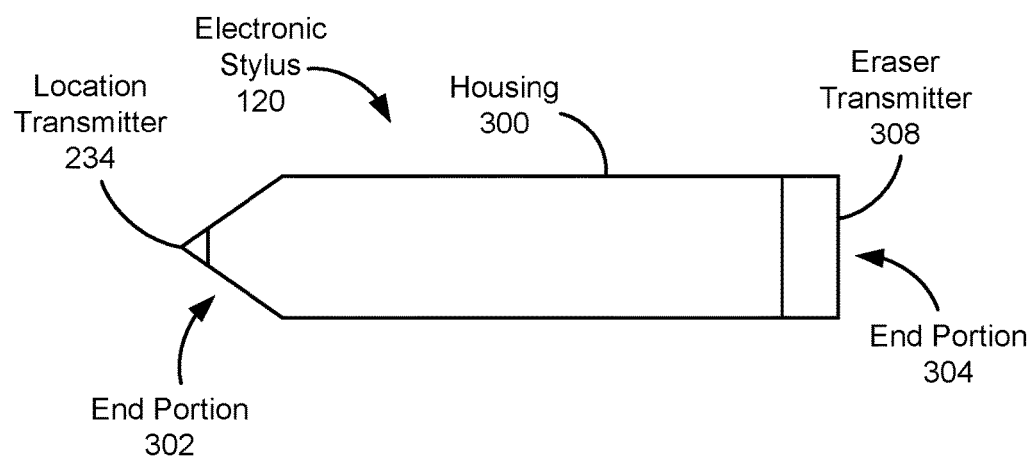
FIG. 3 is a side view of the electronic stylus according to an example implementation.

FIG. 3 is a side view of the electronic stylus 120 according to an example implementation. The electronic stylus 120 may be generally cylindrical, with a generally conical end portion 302. "Generally cylindrical" may mean that the electronic stylus would fit inside a cylinder with a diameter equal to a thickness of the electronic stylus 120 at a greatest distance across the electronic stylus 120, and no portion of an outer surface of the electronic stylus 120 (other than the end portions 302, 304) would be greater than one-tenth of the diameter of the cylinder away from the surface of the cylinder. "Generally conical" may mean that a thickness or diameter of the end portion 302 decreases for portions of the end portion 302 that are farther from the opposite end portion 304. The electronic stylus 120 may include a housing 300, which surrounds and/or supports components of the electronic stylus 120 described herein.

The housing 300 may support the location transmitter 234 at the end portion 302 of the electronic stylus 120. The location transmitter 234 may transmit wireless and/or electromagnetic signals, such as infrared signals, that the display 106, 156, 260 and computing system 100, 150, 250 receive and process to determine which location on the display 106, 156, 260 that the electronic stylus 120 is near and/or proximal to. The location transmitter 234 may transmit the signals in a narrow beam, enabling the computing system 100, 150, 250 to determine a specific location that the location transmitter 234 is at or near.

The computing system 100, 150, 250 may modify the presentation on the display 106, 156, 260 at the location that the location transmitter 234 is near and/or proximal to, such as by placing a cursor on the display 106, 156, 260 at the location that the location transmitter 234 is near or proximal to, highlighting text 122 that the location transmitter 234 swipes across, or responding to taps of buttons such as a copy button 116, 166 and a paste button 118, 168, or copying and/or pasting text 172, as non-limiting examples.

In an example implementation, the electronic stylus 120 may include an eraser transmitter 308. The eraser transmitter 308 may be located at an opposite end portion 304 from the location transmitter 234. A user may turn the electronic stylus 120 around to erase markings and/or text from the display 106, 156, 260.

The eraser transmitter 308 may transmit a location of the eraser transmitter 308, such as by optical output and/or electromagnetic radiation, to the display 106, 156, 260 and/or computing system 100, 150, 250. The eraser transmitter 308 may prompt the computing system 100, 150, 250 to erase markings and/or text from the display 106, 156, 260 at a location near the eraser transmitter 308.

Figure 4:
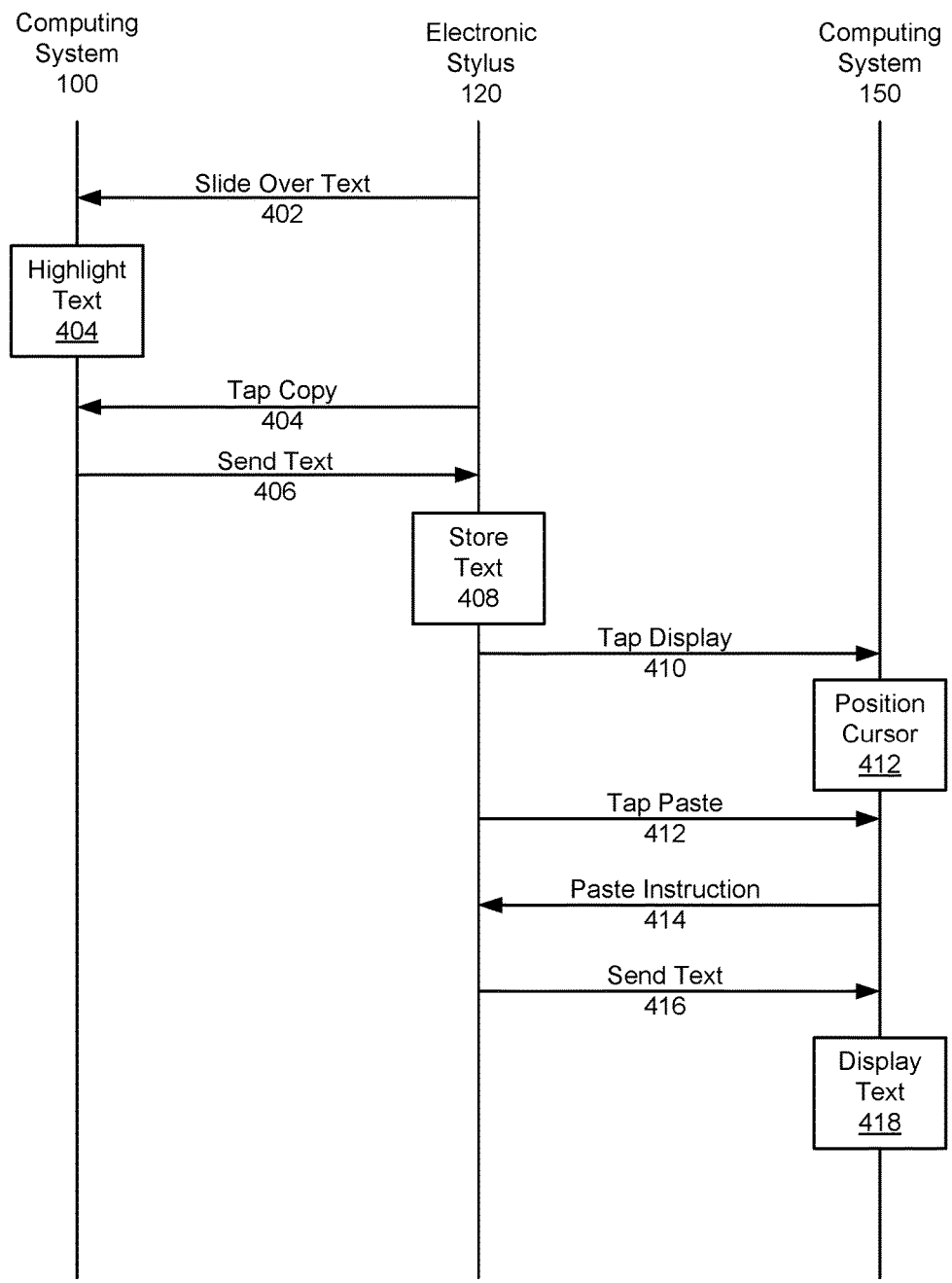
FIG. 4 is a timing diagram showing the electronic stylus copy text from the first computing system and paste the text into the second computing system according to an example implementation.

FIG. 4 is a timing diagram showing the electronic stylus 120 copy text 122 from the first computing system 100 and paste the text 172 into the second computing system 150 according to an example implementation. While FIG. 4 shows the first computing system 100 providing text to the electronic stylus 120 and the second computing system 150 receiving text from the electronic stylus 120, the functions, methods, and/or techniques described herein may be performed by any computing system 100, 150, and roles of the computing systems 100, 150 may be combined or reversed.

A user of the electronic stylus 120 may slide the electronic stylus 120 over text 122 (402), or may encircle the text 122 with the electronic stylus 120. For example, the end portion 302 and/or location transmitter 234 of the electronic stylus 120 may slide over or encircle text 114 on the display 106 of the first computing system 100. The first computing system 100 may detect the location and motion of the electronic stylus 120 sliding over the text 114 and determine that the text 122 over which the electronic stylus 120 slid should be highlighted.

The computing system 100 may highlight the text 122 (404) based on determining that the electronic stylus 120 slid over or encircled the text 122, as shown in FIG. 1B. The computing system 100 may highlight the text 122 by changing an appearance of the text 122, such as changing a background color of the text 122, changing a color of the text 122, or changing a font or typeface of the text 122, as non-limiting examples.

After the computing system 100 has highlighted the text 122, the electronic stylus 120 may tap a copy button 116 (404) on the display 106 of the computing system 100, as shown in FIG. 1C. In response to determining that the electronic stylus 120 has tapped the copy button 116, the computing system 100 may initiate a copy operation. The copy operation may include the first computing system 100 sending the text 122 (406) to the electronic stylus 120. The electronic stylus 120 may store the text 122 (408) in memory 218.

After the electronic stylus 120 has stored the text 122 (408), the user may move the electronic stylus 120 to a second computing system 150. As shown in FIG. 1D, the user may cause the electronic stylus 120 to tap the display 156 (410) of the second computing system 150. The second computing system 150 may detect that the electronic stylus 120 has tapped the display 156 (410), and respond to the tapping the display 156 (410) by positioning a cursor (412) at a cursor location 164 where the electronic stylus 120 tapped the display 156 (410), as shown in FIG. 1D.

As shown in FIG. 1E, after the second computing system 150 has positioned the cursor (412), the user may cause the electronic stylus 120 to tap the paste button 168 (412) on the display 156 of the second computing system. The second computing system 150 may detect the tapping of the paste button 168 (412), and respond to the detected tapping by initiating a paste operation.

The paste operation may include the second computing system 150 sending a paste instruction (414) to the electronic stylus 120. The electronic stylus 120 may respond to receiving the paste instruction (414) by sending the copied text 122 (416) to the second computing system 150. In response to receiving the copied text 122 (416), the second computing system 150 may display the copied text 122 (418) at the cursor location 164 where the electronic stylus 120 tapped the display 156, as shown in FIG. 1E.

Figure 5:
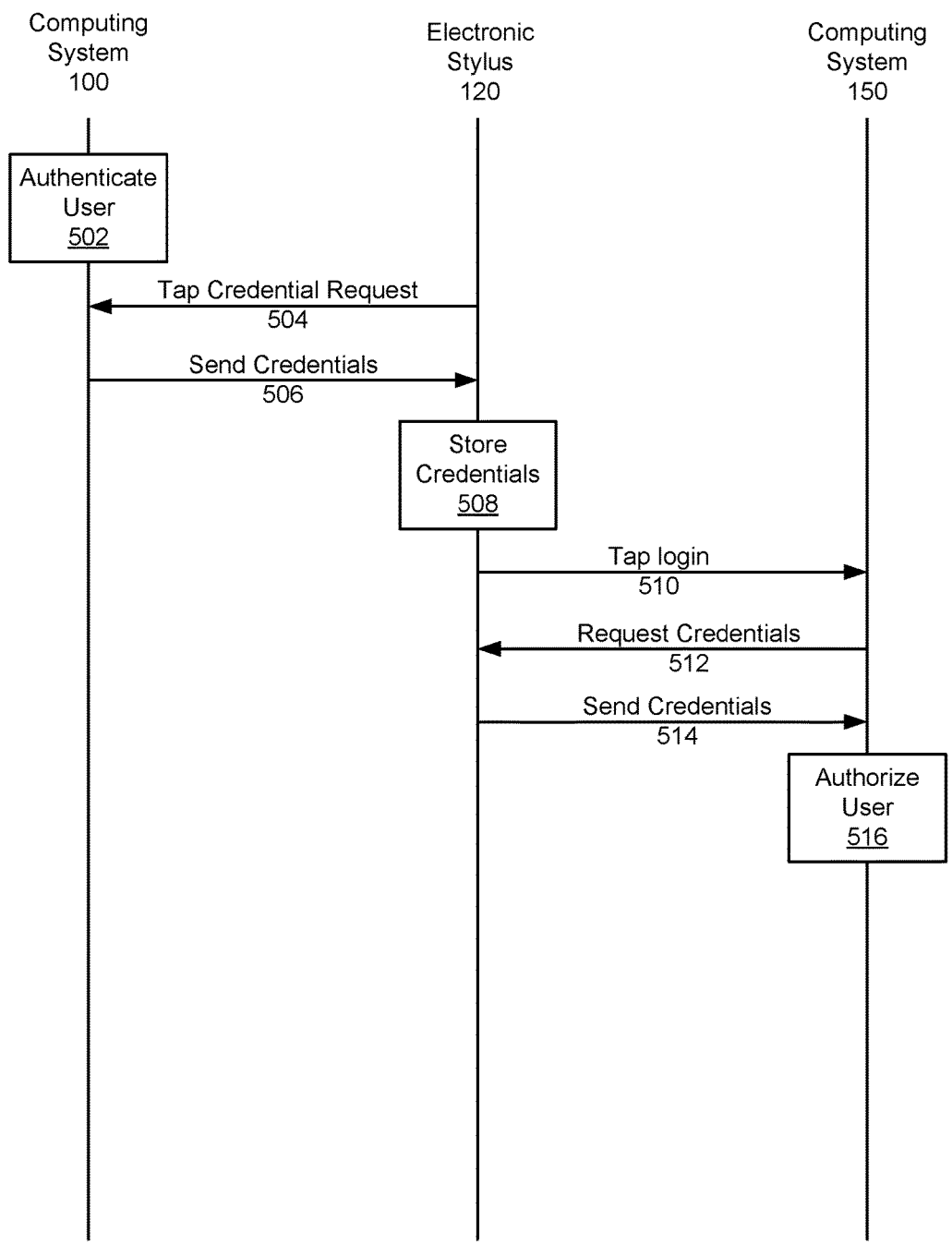
FIG. 5 is a timing diagram showing the electronic stylus receive credentials from the first computing system and provide the credentials to the second computing system.

FIG. 5 is a timing diagram showing the electronic stylus 120 receive credentials from the first computing system 100 and provide the credentials to the second computing system 150. While FIG. 5 shows the first computing system 100 providing credentials to the electronic stylus 120 and the second computing system 150 receiving credentials from the electronic stylus 120, the functions, methods, and/or techniques described herein may be performed by any computing system, and roles of the computing systems 100, 150 may be combined or reversed.

The first computing system 100 may authenticate a user (502). The first computing system 100 may authenticate the user (502) by receiving and verifying a username, passcode, and/or biometric information associated with a user account, for example.

The user may request the first computing system 100 to provide the credentials to the electronic stylus 120, such as by causing the electronic stylus 120 to tap a credentials request button (504) on the first computing system 100. The first computing system 100 may present a credentials request button on a display 106 of the first computing system 100. The first computing system 100 may present the credentials request button during a login session associated with a user account, and the electronic stylus 120 may tap the credentials request button during the login session.

The first computing system 100 may recognize the electronic stylus 120 tapping the credentials request button (504) as a request for the credentials. The first computing system 100 may respond to the request by sending credentials (506) to the electronic stylus 120. The first computing system 100 may have stored the credentials in memory 266. The credentials may include a username and passcode and/or cryptographic keys. The electronic stylus 120 may store the credentials (508) in memory 218.

After the credentials have been stored in the memory 218 of the electronic stylus 120, the user may move the electronic stylus 120 proximal to another computing system, such as the second computing system 150. The user may request to log into the second computing system 150, such as by causing the electronic stylus 120 to tap a login button (510) on the display 156 of the second computing system 150. The second computing system 150 may respond to the request to log in by sending a request credentials message (512) to the electronic stylus 120. The electronic stylus 120 may respond to receiving the request credentials message (512) from the second computing system 150 by sending credentials (514) stored in memory 218 to the computing system 150. The second computing system 150 may compare the credentials (514) received from the electronic stylus to credentials 270 stored in memory 266, and if the credentials (514) match credentials 270 stored in memory 266 in association with a user account, authorize the user account (516) for a login session.

Figure 6:
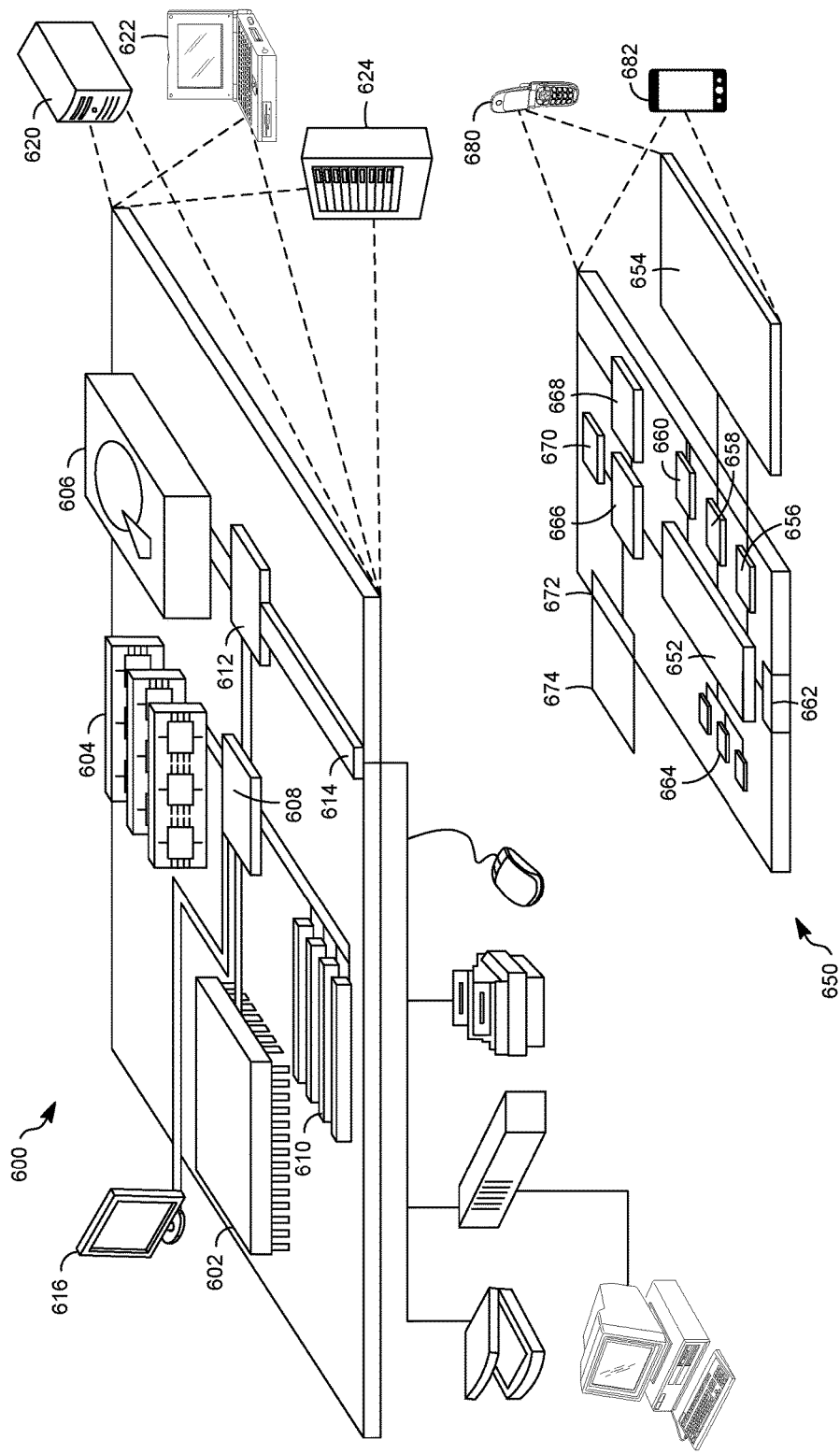
FIG. 6 shows an example of a generic computer device and a generic mobile computer device, which may be used with the techniques described here.

FIG. 6 shows an example of a generic computer device 600 and a generic mobile computer device 650, which may be used with the techniques described here. Computing device 600 is intended to represent various forms of digital computers, such as laptops, desktops, tablets, workstations, personal digital assistants, televisions, servers, blade servers, mainframes, and other appropriate computing devices. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. The processor 602 can be a semiconductor-based processor. The memory 604 can be a semiconductor-based memory. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. An electronic stylus comprising:
   a wireless interface configured to send and receive signals to and from at least a first computing system and a second computing system;
   a memory configured to store authentication credentials; and
   a processor configured to:
      store, in the memory, the authentication credentials received from the first computing system via the wireless interface during a login session with the first computing system; and
      send, to the second computing system via the wireless interface, the authentication credentials received from the first computing system.

2. The electronic stylus of claim 1, wherein the electronic stylus comprises a generally cylindrical body and a generally conical end portion.

3. The electronic stylus of claim 1, wherein the memory is included in the processor.

4. The electronic stylus of claim 1, wherein an end portion of the electronic stylus is configured to modify electromagnetic waves emitted by a display of the first computing system, the modified electromagnetic waves indicating to the first computing system a location of the end portion with respect to the display.

5. The electronic stylus of claim 1, further comprising a location transmitter configured to transmit, to either the first computing system or the second computing system, a signal based on which either the first computing system or the second computing system determines a location of an end portion of the electronic stylus with respect to a display of either the first computing system or the second computing system.

6. The electronic stylus of claim 1, wherein the processor is further configured to store, in the memory, a text string received from the first computing system via the wireless interface in response to receiving a copy instruction from the first computing system.

7. The electronic stylus of claim 1, wherein the processor is further configured to receive a copy instruction, the copy instruction including a text string.

8. The electronic stylus of claim 1, wherein the first computing system further sends a text string to the electronic stylus in response to the electronic stylus tapping a copy button on a display of the first computing system.

9. The electronic stylus of claim 1, wherein the processor is further configured to send, to the second computing system via the wireless interface, a text string received from the first computing system and stored in the memory in response to receiving a paste instruction from the second computing system.

10. The electronic stylus of claim 1, wherein the processor is further configured to:
store, in the memory, a text string received from the first computing system via the wireless interface in response to receiving a copy instruction from the first computing system; and
send, to the second computing system via the wireless interface, the text string received from the first computing system and stored in the memory in response to receiving a paste instruction from the second computing system.

11. The electronic stylus of claim 10, wherein the text string is included in the copy instruction.

12. The electronic stylus of claim 1, wherein the processor is further configured to receive, from the first computing system, a text string that has been highlighted on a display of the first computing system based on input into a display of the first computing system by the electronic stylus before the first computing system sent the text string to the electronic stylus.

13. The electronic stylus of claim 1, further comprising sending, to the second computing system via the wireless interface, a text string received from the first computing system and stored in the memory, the sending the text string prompting the second computing system to display the text string on a display of the second computing system.

14. The electronic stylus of claim 1, wherein the processor is configured to:
recognize a copy gesture based on movement of the electronic stylus; and
prompt the first computing system to send a text string to the electronic stylus based on the recognized copy gesture.

15. The electronic stylus of claim 1, wherein the processor is configured to:
recognize a paste gesture based on movement of the electronic stylus; and
send, to the second computing system via the wireless interface based on the recognized paste gesture, a text string received from the first computing system and stored in the memory.

16. The electronic stylus of claim 1, wherein the processor is configured to send identification and authentication credentials associated with a user account to the second computing system via the wireless interface.

17. The electronic stylus of claim 16, wherein the processor is configured to:
receive the identification and authentication credentials from the first computing system via the wireless interface during the login session with the first computing system, the login session being associated with the user account; and
store the identification and authentication credentials in the memory.

18. The electronic stylus of claim 17, wherein:
the identification and authentication information comprises first identification and authentication credentials associated with a first user account; and
the processor is configured to:
receive second identification and authentication credentials from the second computing system via the wireless interface during a login session with the second computing system associated with a second user account; and
overwrite the first identification and authentication credentials in the memory with the second identification and authentication credentials.

19. The electronic stylus of claim 1, wherein:
the electronic stylus further comprises a rechargeable battery; and
the electronic stylus is configured to recharge the rechargeable battery while the electronic stylus is inside the first computing system.

20. The electronic stylus of claim 1, wherein the processor is further configured to:
store state information associated with a browser running on the first computing system; and
send the state information to the second computing system.

21. A non-transitory computer-readable storage medium comprising instructions stored thereon that, when executed by at least one processor, are configured to cause a first computing system to at least:
wirelessly send, to a first electronic stylus during a first login session associated with a user account, credentials associated with the user account;
wirelessly receive, from the electronic stylus, the credentials during a login attempt for a second login session; and
authorize the second login session in response to receiving the credentials from the electronic stylus.

22. A non-transitory computer-readable storage medium comprising instructions stored thereon that, when executed by at least one processor, are configured to cause an electronic stylus to at least:
store authentication credentials received from a first computing system via a wireless interface during a login session with the first computing system; and
send, to a second computing system via the wireless interface, the authentication credentials received from the first computing system.

23. The non-transitory computer-readable storage medium of claim 22, wherein the instructions are further configured to cause the electronic stylus to receive a text string within a copy instruction.

24. The non-transitory computer-readable storage medium of claim 22, wherein the instructions are configured to cause the electronic stylus to send, to the second computing system via the wireless interface, a text string received from the first computing system in response to receiving a paste instruction from the second computing system.

25. An electronic stylus comprising:
a wireless interface configured to send and receive signals to and from at least a first computing system and a second computing system; and
a trusted platform module (TPM) configured to:
encrypt credentials received from a first computing system via the wireless interface;
store the encrypted credentials; and
transmit the stored credentials to a second computing system via the wireless interface.

26. The electronic stylus of claim 25, wherein the TPM is configured to decrypt the stored credentials and send the decrypted credentials to the second computing system via the wireless interface.

27. The electronic stylus of claim 25, wherein the TPM is configured to:
decrypt the stored credentials;
re-encrypt the stored credentials; and
send the re-encrypted stored credentials to the second computing system.

28. The electronic stylus of claim 25, wherein the TPM is configured to transmit the stored credentials to the second computing system in response to receiving a request for credentials message from the second computing system.

\* \* \* \* \*